United States Patent
Hsiao et al.

(10) Patent No.: US 9,502,965 B1
(45) Date of Patent: Nov. 22, 2016

(54) BURST MODE POWER SUPPLY METHOD AND BURST MODE POWER SUPPLY APPARATUS

(71) Applicant: Chicony Power Technology Co., Ltd., New Taipei (TW)

(72) Inventors: Yung-Hung Hsiao, New Taipei (TW); Cheng-Chang Hsiao, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/740,570

(22) Filed: Jun. 16, 2015

(51) Int. Cl.
 *H02M 3/00* (2006.01)
 *H02M 3/04* (2006.01)
 *H02M 3/335* (2006.01)
 *H02M 3/156* (2006.01)
 *H02M 3/158* (2006.01)

(52) U.S. Cl.
 CPC .............. *H02M 3/04* (2013.01); *H02M 3/156* (2013.01); *H02M 3/1588* (2013.01); *H02M 3/33507* (2013.01)

(58) Field of Classification Search
 CPC ......... H02M 2001/0032; H02M 1/08; H02M 2001/0025; H02M 2001/0035; H02M 3/1588; H02M 3/156; H02M 3/33507
 See application file for complete search history.

(56) References Cited

U.S. PATENT DOCUMENTS

| | | | | |
|---|---|---|---|---|
| 2011/0085354 A1* | 4/2011 | Wang | ................. | H02M 1/4225 363/21.02 |
| 2011/0267024 A1* | 11/2011 | Halberstadt | ........... | H02M 3/156 323/304 |
| 2012/0250378 A1* | 10/2012 | Kok | ....................... | H02M 3/156 363/78 |
| 2014/0016362 A1* | 1/2014 | Adragna | ............... | H02M 3/158 363/21.02 |

FOREIGN PATENT DOCUMENTS

JP 2014003810 A 1/2014

OTHER PUBLICATIONS

Office Action Dated Aug. 16, 2016 of the Corresponding Japan Patent Application No. 2015-122048.

* cited by examiner

*Primary Examiner* — Adolf Berhane
*Assistant Examiner* — Henry Lee, III
(74) *Attorney, Agent, or Firm* — Chun-Ming Shih; HDLS IPR Services

(57) ABSTRACT

A power supply apparatus (10) includes a voltage input side (102), a power switch circuit (104), a voltage output side (106) and a pulse width modulation signal generating circuit (108). According to a pulse width modulation signal (112), the pulse width modulation signal generating circuit (108) controls the power switch circuit (104), so that the power supply apparatus (10) enters a burst mode. A pulse quantity of each of burst clumps of the power supply apparatus (10), a pulse frequency of each of the burst clumps of the power supply apparatus (10) and a pulse duty cycle of each of the burst clumps of the power supply apparatus (10) are fixed and constant after the power supply apparatus (10) enters the burst mode.

10 Claims, 4 Drawing Sheets

BURST MODE POWER SUPPLY METHOD AND BURST MODE POWER SUPPLY APPARATUS

BACKGROUND OF THE INVENTION

Field of the Invention

The present invention relates to a power supply method and a power supply apparatus, and especially relates to a burst mode power supply method and a burst mode power supply apparatus.

Description of the Related Art

The power supply apparatus will enter the burst mode to save energy when the power supply apparatus is in the standby mode or in the light load mode.

The pulse quantity of each of the burst clumps of the related art power supply apparatus, the pulse frequency of each of the burst clumps of the related art power supply apparatus, the pulse duty cycle of each of the burst clumps of the related art power supply apparatus or the burst frequency of the burst clump of the related art power supply apparatus may be changed when the related art power supply apparatus works in the burst mode and the load connected to the related art power supply apparatus is changed (increased or decreased). Therefore, it is difficult to optimize between energy saving and reducing ripple noise. It is difficult to design the related art power supply apparatus.

SUMMARY OF THE INVENTION

In order to solve the above-mentioned problems, an object of the present invention is to provide a burst mode power supply method.

In order to solve the above-mentioned problems, another object of the present invention is to provide a burst mode power supply method.

In order to solve the above-mentioned problems, still another object of the present invention is to provide a burst mode power supply apparatus.

In order to achieve the object of the present invention mentioned above, the burst mode power supply method comprises following steps. A pulse quantity of each of burst clumps of a power supply apparatus, a pulse frequency of each of the burst clumps of the power supply apparatus and a pulse duty cycle of each of the burst clumps of the power supply apparatus are fixed and constant when the power supply apparatus works in a burst mode.

In order to achieve another object of the present invention mentioned above, the burst mode power supply method comprises following steps. A power supply apparatus enters a burst mode. A pulse quantity of each of burst clumps of the power supply apparatus is fixed and constant after the power supply apparatus enters the burst mode. A pulse frequency of each of the burst clumps of the power supply apparatus is fixed and constant after the power supply apparatus enters the burst mode. A pulse duty cycle of each of the burst clumps of the power supply apparatus is fixed and constant after the power supply apparatus enters the burst mode.

In order to achieve still another object of the present invention mentioned above, the burst mode power supply apparatus comprises a voltage input side, a power switch circuit, a voltage output side and a pulse width modulation signal generating circuit. The power switch circuit is electrically connected to the voltage input side. The voltage output side is electrically connected to the power switch circuit. The pulse width modulation signal generating circuit is electrically connected to the power switch circuit. The pulse width modulation signal generating circuit controls the power switch circuit by a pulse width modulation signal, so that the power supply apparatus enters a burst mode. A pulse quantity of each of burst clumps of the power supply apparatus is fixed and constant after the power supply apparatus enters the burst mode. A pulse frequency of each of the burst clumps of the power supply apparatus is fixed and constant after the power supply apparatus enters the burst mode. A pulse duty cycle of each of the burst clumps of the power supply apparatus is fixed and constant after the power supply apparatus enters the burst mode. A burst frequency of the burst clump is not fixed after the power supply apparatus enters the burst mode.

The advantage of the present invention is that when the power supply apparatus works in the burst mode, more energy is saved and ripple noise is reduced efficiently, so that it is easier to design the power supply apparatus.

DETAILED DESCRIPTION OF THE INVENTION

Please refer to following detailed description and figures for the technical content of the present invention. The following detailed description and figures are referred for the present invention, but the present invention is not limited to it.

Figure 1:
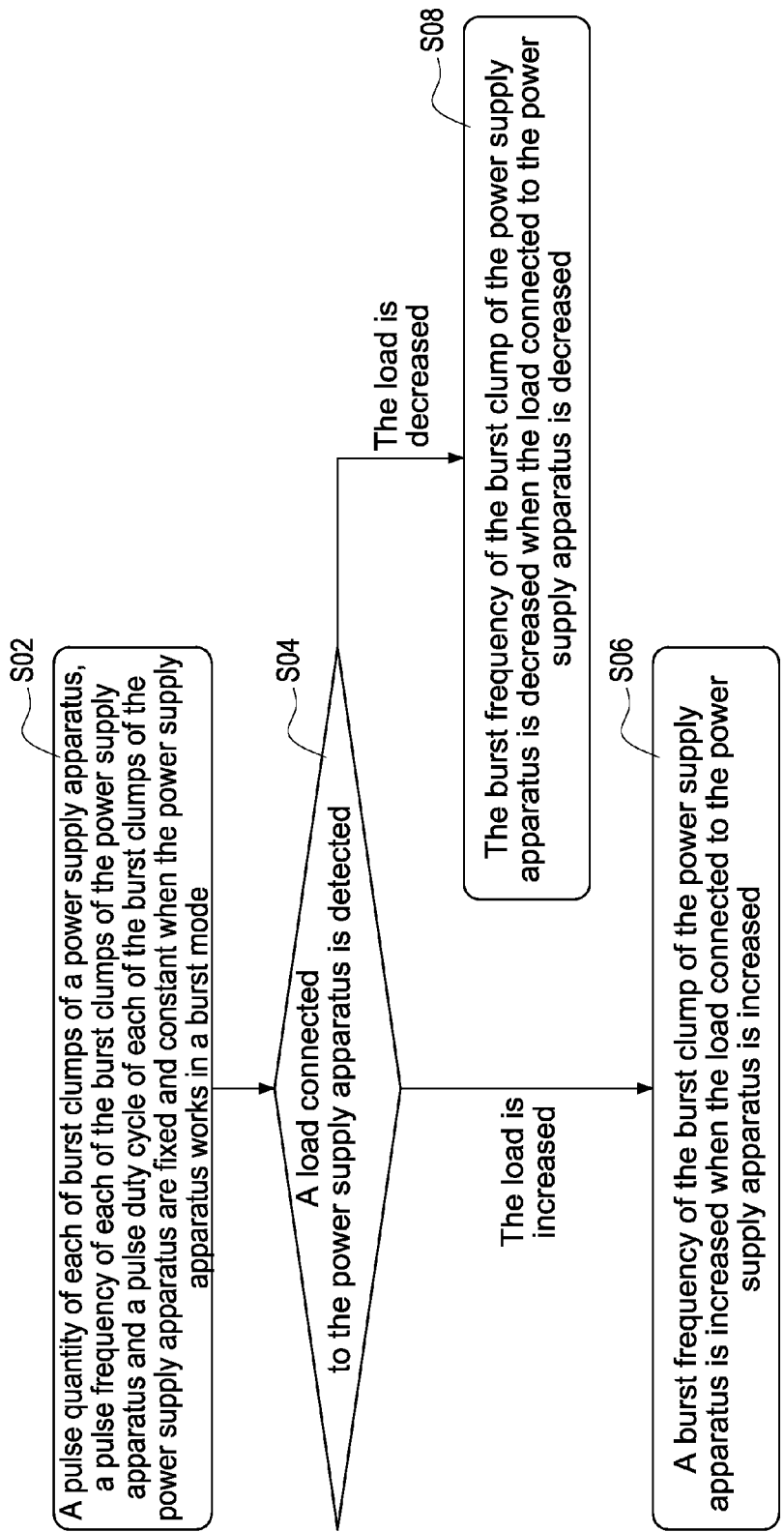
FIG. 1 shows a flow chart of the first embodiment of the burst mode power supply method of the present invention.

FIG. 1 shows a flow chart of the first embodiment of the burst mode power supply method of the present invention. The burst mode power supply method of the present invention comprises following steps.

S02: A pulse quantity of each of burst clumps of a power supply apparatus, a pulse frequency of each of the burst clumps of the power supply apparatus and a pulse duty cycle of each of the burst clumps of the power supply apparatus are fixed and constant when the power supply apparatus works in a burst mode.

S04: A load connected to the power supply apparatus is detected.

If the load connected to the power supply apparatus is increased, the process goes to step S06. If the load connected to the power supply apparatus is decreased, the process goes to step S08.

S06: A burst frequency of the burst clump of the power supply apparatus is increased when the load connected to the power supply apparatus is increased.

S08: The burst frequency of the burst clump of the power supply apparatus is decreased when the load connected to the power supply apparatus is decreased.

Moreover, the pulse quantity of each of the burst clumps of the power supply apparatus, the pulse frequency of each of the burst clumps of the power supply apparatus and the pulse duty cycle of each of the burst clumps of the power supply apparatus are still fixed and constant in the step S06 and S08 mentioned above.

Figure 2:
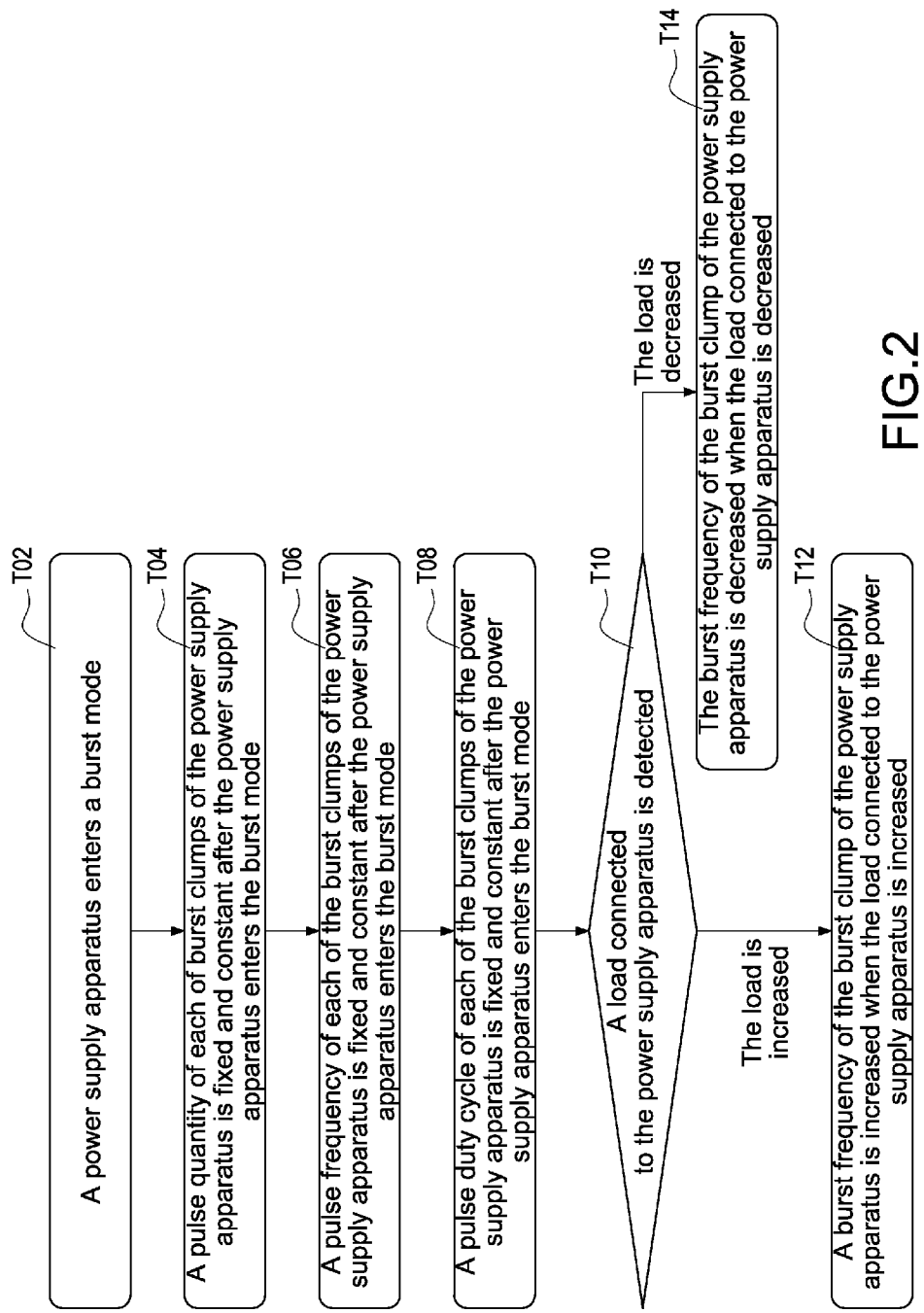
FIG. 2 shows a flow chart of the second embodiment of the burst mode power supply method of the present invention.

FIG. 2 shows a flow chart of the second embodiment of the burst mode power supply method of the present invention. The burst mode power supply method of the present invention comprises following steps.

T02: A power supply apparatus enters a burst mode.

T04: A pulse quantity of each of burst clumps of the power supply apparatus is fixed and constant after the power supply apparatus enters the burst mode.

T06: A pulse frequency of each of the burst clumps of the power supply apparatus is fixed and constant after the power supply apparatus enters the burst mode.

T08: A pulse duty cycle of each of the burst clumps of the power supply apparatus is fixed and constant after the power supply apparatus enters the burst mode.

T10: A load connected to the power supply apparatus is detected.

If the load connected to the power supply apparatus is increased, the process goes to step T12. If the load connected to the power supply apparatus is decreased, the process goes to step T14.

T12: A burst frequency of the burst clump of the power supply apparatus is increased when the load connected to the power supply apparatus is increased.

T14: The burst frequency of the burst clump of the power supply apparatus is decreased when the load connected to the power supply apparatus is decreased.

Moreover, the pulse quantity of each of the burst clumps of the power supply apparatus, the pulse frequency of each of the burst clumps of the power supply apparatus and the pulse duty cycle of each of the burst clumps of the power supply apparatus are still fixed and constant in the step T12 and in the step T14 mentioned above.

Figure 3:
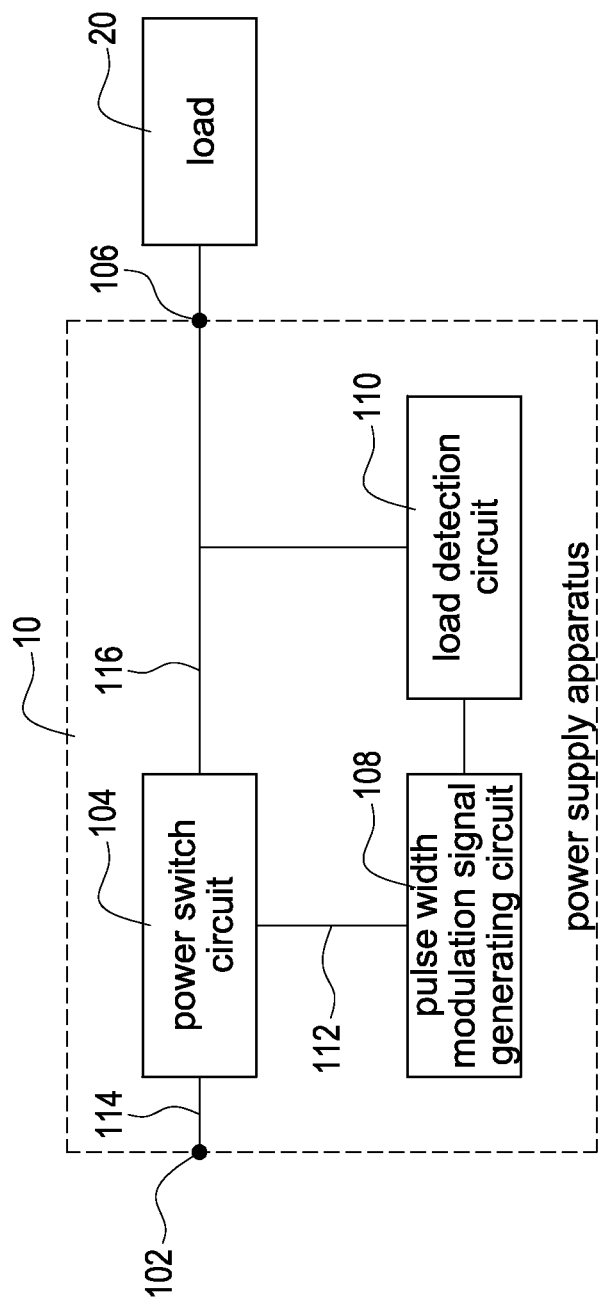
FIG. 3 shows a block diagram of the power supply apparatus of the present invention.

FIG. 3 shows a block diagram of the power supply apparatus of the present invention. A power supply apparatus 10 is applied to a load 20. The power supply apparatus 10 comprises a voltage input side 102, a power switch circuit 104, a voltage output side 106, a pulse width modulation signal generating circuit 108 and a load detection circuit 110.

The power switch circuit 104 is electrically connected to the voltage input side 102 and the load 20. The voltage output side 106 is electrically connected to the power switch circuit 104 and the load 20. The pulse width modulation signal generating circuit 108 is electrically connected to the power switch circuit 104. The load detection circuit 110 is electrically connected to the power switch circuit 104, the voltage output side 106, the pulse width modulation signal generating circuit 108 and the load 20.

The pulse width modulation signal generating circuit 108 controls the power switch circuit 104 by a pulse width modulation signal 112, so that the power supply apparatus 10 enters a burst mode. A pulse quantity of each of burst clumps of the power supply apparatus 10 is fixed and constant after the power supply apparatus 10 enters the burst mode. A pulse frequency of each of the burst clumps of the power supply apparatus 10 is fixed and constant after the power supply apparatus 10 enters the burst mode. A pulse duty cycle of each of the burst clumps of the power supply apparatus 10 is fixed and constant after the power supply apparatus 10 enters the burst mode.

The load detection circuit 110 detects the load 20 and informs the pulse width modulation signal generating circuit 108 of the load 20 after the power supply apparatus 10 enters the burst mode. A burst frequency of the burst clump of the power supply apparatus 10 is increased by the pulse width modulation signal generating circuit 108 when the load 20 is increased, but the pulse quantity of each of the burst clumps of the power supply apparatus 10, the pulse frequency of each of the burst clumps of the power supply apparatus 10 and the pulse duty cycle of each of the burst clumps of the power supply apparatus 10 are still fixed and constant. The burst frequency of the burst clump of the power supply apparatus 10 is decreased by the pulse width modulation signal generating circuit 108 when the load 20 is decreased, but the pulse quantity of each of the burst clumps of the power supply apparatus 10, the pulse frequency of each of the burst clumps of the power supply apparatus 10 and the pulse duty cycle of each of the burst clumps of the power supply apparatus 10 are still fixed and constant.

An input voltage 114 is sent to the power switch circuit 104 through the voltage input side 102. The pulse width modulation signal generating circuit 108 sends the pulse width modulation signal 112 to the power switch circuit 104, so that the power switch circuit 104 is controlled by the pulse width modulation signal 112 to convert the input voltage 114 into an output voltage 116. The power switch circuit 104 outputs the output voltage 116 through the voltage output side 106.

Moreover, the pulse quantity of each of the burst clumps is, for example but not limited to, one, two or n, wherein n is a positive integer greater than zero. The pulse duty cycle of each of the burst clumps is, for example but not limited to, fifty percent conduction.

In the present invention, the pulse quantity of each of the burst clumps of the power supply apparatus, the pulse frequency of each of the burst clumps of the power supply apparatus and the pulse duty cycle of each of the burst clumps of the power supply apparatus are always fixed and constant when the power supply apparatus works in the burst mode. Only the burst frequency of the burst clump of the power supply apparatus is increased when the load connected to the power supply apparatus is increased. Only the burst frequency of the burst clump of the power supply apparatus is decreased when the load connected to the power supply apparatus is decreased. Therefore, it is easy to optimize between energy saving and reducing ripple noise because only the burst frequency is variable. It is easy to design the power supply apparatus.

Figure 4:
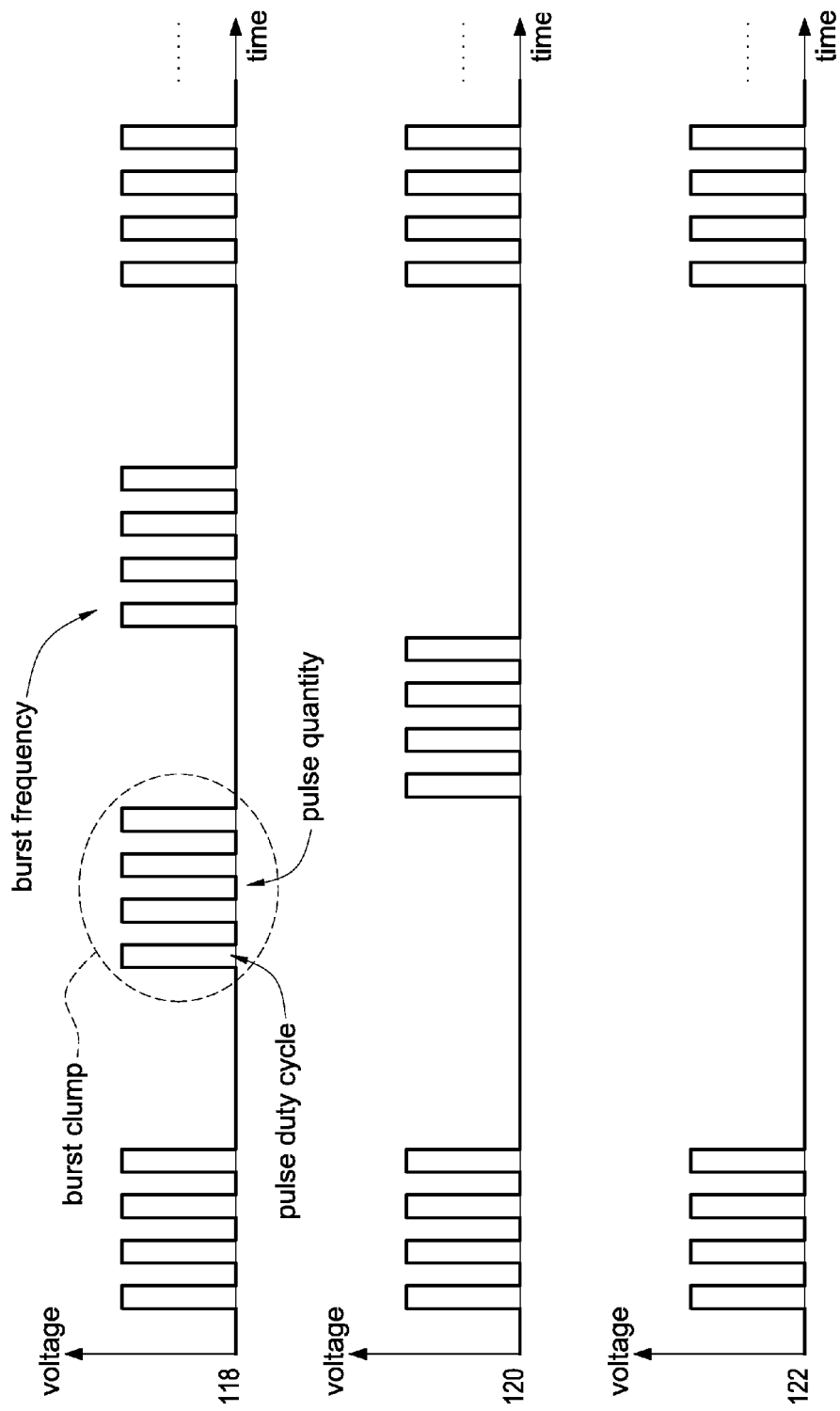
FIG. 4 shows a waveform diagram of a plurality of embodiments of the pulse width modulation signal.

FIG. 4 shows a waveform diagram of a plurality of embodiments of the pulse width modulation signal. The top-down first waveform 118 shows four burst clumps. The top-down second waveform 120 shows three burst clumps. The top-down third waveform 122 shows two burst clumps. The frequency of the burst clump is called the burst frequency. The load 20 in accordance with the top-down third waveform 122 is the minimum. The load 20 in accordance with the top-down second waveform 120 is greater than the load 20 in accordance with the top-down third waveform 122. The load 20 in accordance with the top-down first waveform 118 is greater than the load 20 in accordance with the top-down second waveform 120. The pulse quantity of each of the burst clumps, the pulse frequency of each of the burst clumps and the pulse duty cycle of each of the burst clumps of the three waveforms 118, 120 and 122 mentioned above are the same, fixed and constant. Only the burst frequency is changed according to the load 20. The burst frequency is higher if the load 20 is larger. The burst frequency is lower if the load 20 is smaller.

The advantage of the present invention is that when the power supply apparatus 10 works in the burst mode, more energy is saved and ripple noise is reduced efficiently, so that it is easier to design the power supply apparatus 10.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A burst mode power supply method comprising:
   a. fixing a pulse quantity of each of burst clumps of a power supply apparatus (10), a pulse frequency of each of the burst clumps of the power supply apparatus (10) and a pulse duty cycle of each of the burst clumps of the power supply apparatus (10) when the power supply apparatus (10) works in a burst mode,
   wherein the pulse frequency of each of the burst clumps and the pulse duty cycle of each of the burst clumps are the same in the burst mode; only a burst frequency of the burst clump is changed according to a load (20) in the burst mode; the burst frequency increases if the load (20) increases in the burst mode thus rendering a quantity of the burst clumps increases; the burst frequency decreases if the load (20) decreases in the burst mode thus rendering the quantity of the burst clumps decreases.

2. The burst mode power supply method in claim 1, wherein the pulse quantity of each of the burst clumps is one, two or n, wherein n is a positive integer greater than zero.

3. The burst mode power supply method in claim 1, wherein the pulse duty cycle of each of the burst clumps is fifty percent conduction.

4. A burst mode power supply method comprising:
   a. a power supply apparatus (10) entering a burst mode;
   b. fixing a pulse quantity of each of burst clumps of the power supply apparatus (10) after the power supply apparatus (10) enters the burst mode;
   c. fixing a pulse frequency of each of the burst clumps of the power supply apparatus (10) after the power supply apparatus (10) enters the burst mode; and
   d. fixing a pulse duty cycle of each of the burst clumps of the power supply apparatus (10) after the power supply apparatus (10) enters the burst mode,
   wherein the pulse frequency of each of the burst clumps and the pulse duty cycle of each of the burst clumps are the same in the burst mode; only a burst frequency of the burst clump is changed according to a load (20) in the burst mode; the burst frequency increases if the load (20) increases in the burst mode thus rendering a quantity of the burst clumps increases; the burst frequency decreases if the load (20) decreases in the burst mode thus rendering the quantity of the burst clumps decreases.

5. The burst mode power supply method in claim 4, wherein the pulse quantity of each of the burst clumps is one, two or n, wherein n is a positive integer greater than zero.

6. The burst mode power supply method in claim 4, wherein the pulse duty cycle of each of the burst clumps is fifty percent conduction.

7. A power supply apparatus (10) comprising:
   a voltage input side (102);
   a power switch circuit (104) electrically connected to the voltage input side (102);
   a voltage output side (106) electrically connected to the power switch circuit (104); and
   a pulse width modulation signal generating circuit (108) electrically connected to the power switch circuit (104),
   wherein the pulse width modulation signal generating circuit (108) controls the power switch circuit (104) by a pulse width modulation signal (112), so that the power supply apparatus (10) enters a burst mode; a pulse quantity of each of burst clumps of the power supply apparatus (10) is fixed and constant after the power supply apparatus (10) enters the burst mode; a pulse frequency of each of the burst clumps of the power supply apparatus (10) is fixed and constant after the power supply apparatus (10) enters the burst mode; a pulse duty cycle of each of the burst clumps of the power supply apparatus (10) is fixed and constant after the power supply apparatus (10) enters the burst mode;
   wherein the pulse frequency of each of the burst clumps and the pulse duty cycle of each of the burst clumps are the same in the burst mode; only a burst frequency of the burst clump is changed according to a load (20) in the burst mode; the burst frequency increases if the load (20) increases in the burst mode thus rendering a quantity of the burst clumps increases; the burst frequency decreases if the load (20) decreases in the burst mode thus rendering the quantity of the burst clumps decreases.

8. The power supply apparatus (10) in claim 7, wherein an input voltage (114) is sent to the power switch circuit (104) through the voltage input side (102); the pulse width modulation signal generating circuit (108) sends the pulse width modulation signal (112) to the power switch circuit (104), so that the power switch circuit (104) is controlled by the pulse width modulation signal (112) to convert the input voltage (114) into an output voltage (116); the power switch circuit (104) outputs the output voltage (116) through the voltage output side (106).

9. The power supply apparatus (10) in claim 7, wherein the pulse quantity of each of the burst clumps is one, two or n, wherein n is a positive integer greater than zero.

10. The power supply apparatus (10) in claim 7, wherein the pulse duty cycle of each of the burst clumps is fifty percent conduction.

* * * * *